(12) United States Patent
Lecuyer et al.

(10) Patent No.: US 8,506,253 B2
(45) Date of Patent: Aug. 13, 2013

(54) BALANCING APPARATUS FOR ROTOR ASSEMBLY

(75) Inventors: Joseph Daniel Lecuyer, Verdun (CA); Bruno Chatelois, Boucherville (CA)

(73) Assignee: Pratt & Whitney Canada Corp., Longueuil, Quebec ( * ) Notice: Subject to any disclaimer, the term of this patent is extended or adjusted under 35 U.S.C. 154(b) by 1029 days.

(21) Appl. No.: 12/543,829

(22) Filed: Aug. 19, 2009

(65) Prior Publication Data

US 2011/0044816 A1    Feb. 24, 2011

(51) Int. Cl.
*F01D 5/16*    (2006.01)

(52) U.S. Cl.
USPC .......................................................... 416/145

(58) Field of Classification Search
USPC .................................. 416/145, 144
See application file for complete search history.

(56) References Cited

U.S. PATENT DOCUMENTS

| | | |
|---|---|---|
| 3,273,419 A | 9/1966 | Kollmann et al. |
| 3,736,811 A | 6/1973 | Neary |
| 4,803,893 A | 2/1989 | Bachinski |
| 4,817,455 A | 4/1989 | Buxe |
| 4,842,485 A | 6/1989 | Barber |
| 4,848,182 A | 7/1989 | Novotny |
| 4,879,792 A | 11/1989 | O'Connor |
| 4,926,710 A | 5/1990 | Novotny |
| 5,011,374 A | 4/1991 | Miller |
| 5,018,943 A | 5/1991 | Corsmeier et al. |
| 6,279,420 B1 | 8/2001 | Knorowski et al. |
| 6,481,969 B2 | 11/2002 | Berry et al. |
| 6,893,222 B2 | 5/2005 | Allam |
| 7,347,672 B2 | 3/2008 | Bertrand et al. |
| 2008/0095613 A1 | 4/2008 | Blanchard et al. |
| 2011/0027085 A1* | 2/2011 | Glasspoole et al. .......... 416/145 |

* cited by examiner

*Primary Examiner* — Edward Look
*Assistant Examiner* — Maxime Adjagbe
(74) *Attorney, Agent, or Firm* — Norton Rose Fulbright Canada LLP (57) ABSTRACT

A balancing assembly for a rotor assembly of a gas turbine engine includes a flange engaging portion defining a flange receiving opening for mating with the flange in a slidable manner. A hole extends through at least part of the flange engaging portion, the hole corresponding in size to a recess and adapted to receive a rivet or other suitable fastener to fix the balancing weight with respect to the disc.

20 Claims, 9 Drawing Sheets

Fig-7d

BALANCING APPARATUS FOR ROTOR ASSEMBLY

TECHNICAL FIELD

The application relates generally to gas turbine engines, more particularly to balancing of rotor assemblies in such gas turbine engines.

BACKGROUND

In gas turbine engines, balancing rotors is of importance for reducing vibrations. Usually, in order to balance a rotor, holes are provided in the disc to allow balancing weights to be secured to the rotor at a particular circumferential position. Such holes may introduce undesirable stress concentrations. In addition, the holes may be required to be in an area of the disc where stresses are low enough and sensitivity to tool marks is minimal, and thus constrain the designer.

Accordingly, there is a need to provide an improved approach for balancing a rotor assembly of a gas turbine engine.

SUMMARY

There is provided a rotor assembly for a gas turbine engine, comprising: a disc adapted for mounting to an engine shaft defining a longitudinal axis, the disc having two opposed faces; a flange extending axially from one of the two opposed faces of the disc along a circumference thereof, an edge of the flange having at least one positioning recess and at least one rivet recess, the at least one positioning recess being larger than the at least one rivet recess; a projection extending circumferentially along a surface of the flange; at least one balancing weight adapted for balancing the rotor assembly and comprising a flange engaging portion and a hook portion, the flange engaging portion defining a flange receiving opening for mating with the flange of the disc, the hook portion extending from one end of the flange engaging portion and defining a projection receiving opening for mating with the projection, at least part of the flange engaging portion being sized to fit through the positioning recess when engaging the hook portion with the projection to lock the balancing weight in an axial direction with respect to the disc, the balancing weight having a rivet hole extending through at least part of the flange engaging portion, the rivet hole being aligned with the rivet recess when the balancing weight is secured to the disc; and a rivet inserted through the rivet hole and the rivet recess to lock the balancing weight in a circumferential direction with respect to the disc.

There is also provided a balancing weight having a flange extending axially from a face of the disc around a circumference thereof, an edge of the flange having at least one positioning recess and at least one rivet recess, the at least one positioning recess being larger than the at least one rivet recess, the flange having a projection extending circumferentially along a surface thereof, the balancing weight comprising: a flange engaging portion defining a flange receiving opening for mating with the flange, a rivet hole extending through at least part of the flange engaging portion, the rivet hole corresponding in size to the rivet recess and adapted to receive a rivet to lock the balancing weight in a circumferential direction with respect to the disc; and a hook portion extending from one end of the flange engaging portion and defining a projection receiving opening for mating with the projection, at least part of the flange engaging portion being sized to fit through the positioning recess when engaging the hook portion with the projection to lock the balancing weight in an axial direction with respect to the disc.

In a further aspect, there is provided a method for attaching a balancing weight to a rotor disc, the disc having a flange extending axially from a face of the disc around a circumference thereof, an edge of the flange having at least one positioning recess and at least one rivet recess, the at least one positioning recess being larger than the at least one rivet recess, the flange having a projection extending circumferentially along a surface thereof, the method comprising: radially inserting at least one balancing weight into one of the at least one positioning recess, the at least one balancing weight having a flange engaging portion defining a flange receiving opening for mating with the flange, a rivet hole extending through at least part of the flange engaging portion, and a hook portion extending from one end of the flange engaging portion and defining a projection receiving opening for mating with the projection, at least part of the flange engaging portion being sized to fit through the positioning recess; engaging the hook portion with the projection to lock the at least one balancing weight in an axial direction with respect to the disc; sliding the at least one balancing weight along the circumference of the flange such that the rivet hole is aligned with one of the at least one rivet recesses; and inserting a rivet through the aligned rivet hole and rivet recess to lock the at least one balancing weight in a circumferential direction with respect to the disc.

DESCRIPTION OF THE DRAWINGS

Reference is now made to the accompanying figures, in which:

FIG. 3b is an isometric view of the balancing weight of FIG. 3a;

DETAILED DESCRIPTION

Figure 1:
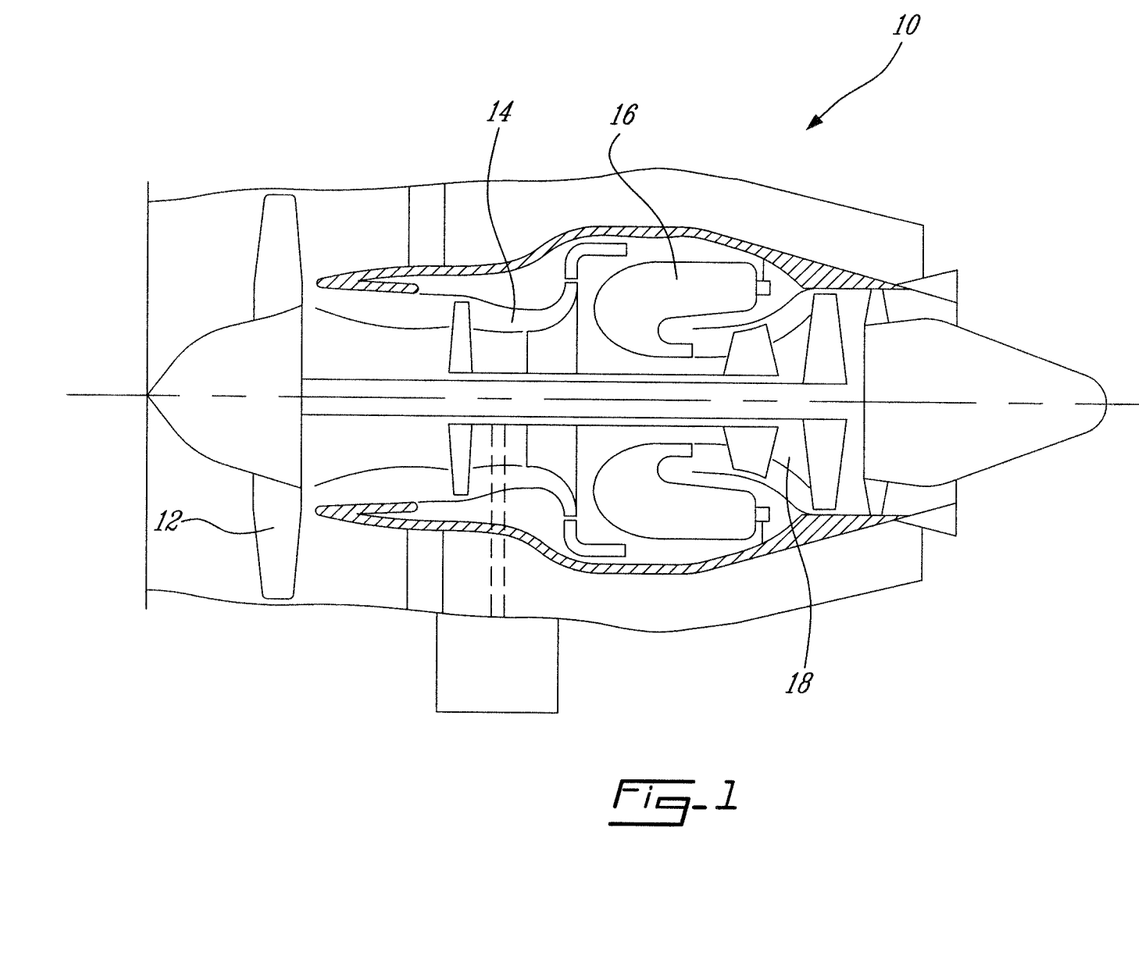
FIG. 1 is a schematic cross-sectional view of a gas turbine engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
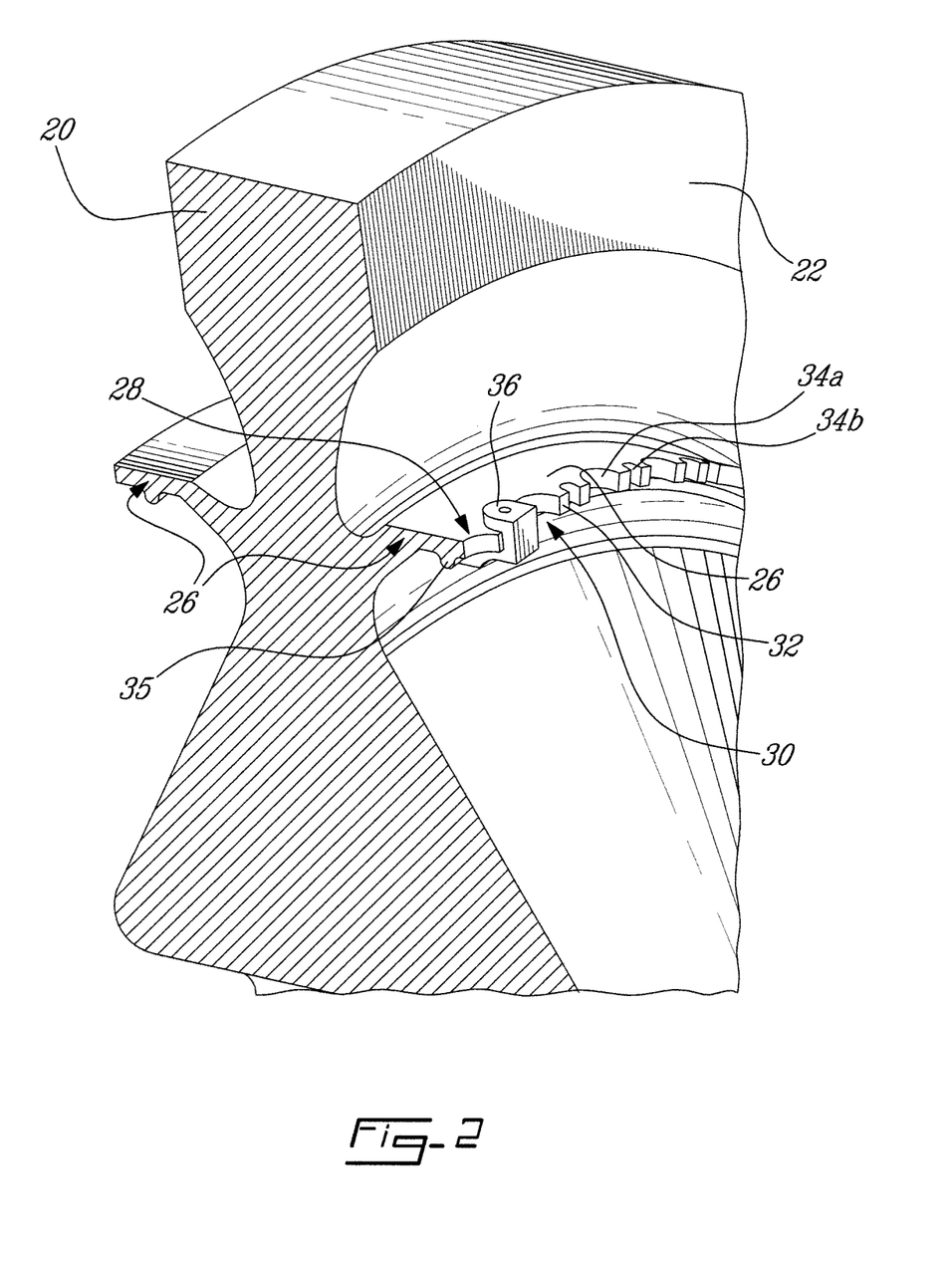
FIG. 2 is a partial sectional view of a rotor disk having a recessed flange and a balancing weight thereon, in accordance with an embodiment.

FIG. 2 is a cross-sectional view of a compressor or turbine disc 20 adapted to form a rotor assembly when mounted to an engine shaft of a gas turbine engine such as shown in FIG. 1. The disc 20 is to be mounted perpendicularly to a longitudinal axis of the engine shaft such that a rotation of the engine shaft drives the disc 20. The disc 20 comprises opposed front and rear circular faces 22. A circumferential flange 26 extends axially from each the front and the rear faces 22 of the disc 20. The flanges 26 are concentrically disposed relative to the central axis of the engine.

The flange 26 has a radially outer face 28 and a radially inner face 30 separated by a circumferential edge 32. The circumferential edge 32 is provided with a plurality of uniformly circumferentially distributed recesses, including an array of position recesses 34a and an array of rivet recess 34b. Each recess 34a, 34b extends radially through the thickness of the flange 26 from the radially outer face 28 to the radially inner face 30.

In the illustrated embodiment, the recesses 34a, 34b alternate along the circumference of the flange 26. In an alternative embodiment, a single positioning recess 34a and multiple rivet recesses 34b are provided. In yet another embodiment, a positioning recess 34a is provided at each one of the four quadrants of the disc 20 and multiple rivet recesses 34b are provided in between each positioning recess 34a. Various other alternative configurations are also possible.

The positioning recesses 34a are sized to allow a balancing weight 36 to be inserted radially from the radially inward face 30 to the radially outward face 28. The rivet recesses 34b are sized to generally correspond to the diameter of a rivet that is inserted transversely to the flange 26 in a rivet hole provided in the balancing weight 36 for securing the balancing weight 36 against circumferential sliding movement along the flange 26, as will be seen hereinafter. A projection or ridge 35 extends along the radially inner face 30 of the flange 26 and acts as a hook feature to axially retain the balancing weight 36 along the flange 26.

At least one balancing weight 36 is removably secured to the flange 26. The mass and the circumferential position about the flange of the balancing weight 36 are chosen so that the rotor assembly is balanced when the balancing weight 36 is removably secured to the flange 26 at said position. As illustrated in FIG. 2, the balancing weight 36 is positioned on the flange 26 and aligned with a recess 34b. The balancing weight 36 is inserted radially from below the flange 26 through a positioning recess 34a to engage with the projection 35 and is then slid along the circumferential edge 32 of the flange 26 to the adjacent rivet recess 34b. A rivet is inserted through a rivet hole of the balancing weight 36 and through the rivet recess 34b. The projection 35 serves to retain the balancing weight 36 in the axial direction while the rivet serves to retain the balancing weight 36 in the circumferential direction.

Figure 3A:
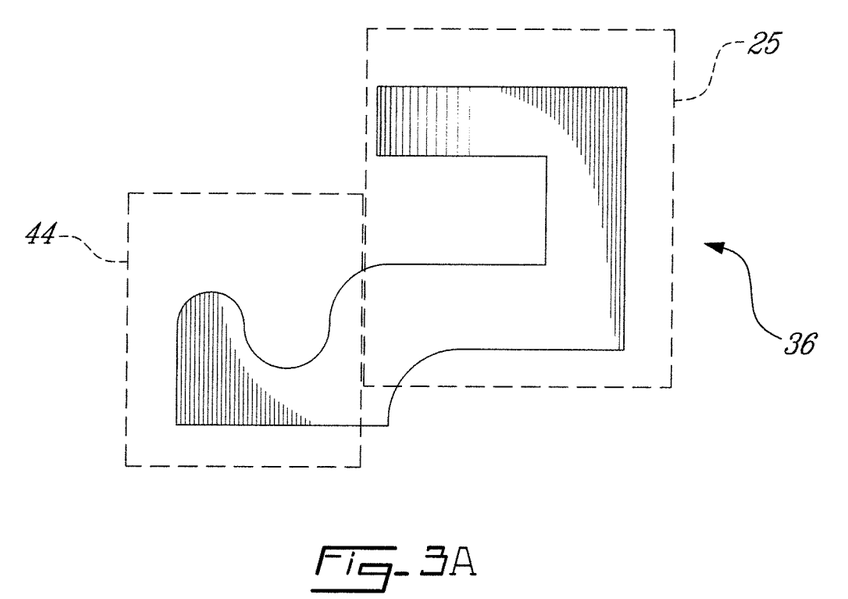
FIG. 3a is a front view of a balancing weight engageable in accordance with an embodiment.
Figure 3B:
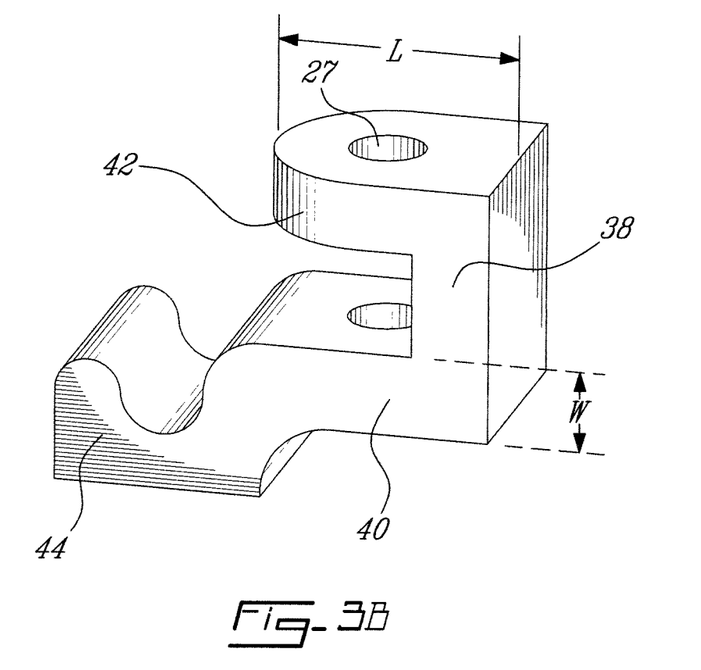

As seen in FIGS. 3a and 3b, an embodiment of the balancing weight 36 is shown in an unsecured or detached position, i.e. when the balancing weight 36 is not secured to the flange 26. The balancing weight 36 comprises a flange engaging portion 25 defining a flange receiving opening and a hook portion 44 defining a projection receiving opening. A rivet hole 27 extends through the flange engaging portion 25.

In one embodiment, the balancing weight 36 comprises a weight portion 38, a first flange engaging portion 40, and a second flange engaging portion 42. The first and second flange engaging portions 40 and 42 project substantially perpendicularly from the weight portion 38 at opposite ends of the weight portion 38. The space between the first and second flange engaging portions 40 and 42 defines the flange receiving opening and generally corresponds to the thickness of the flange 27. The hook portion 44 is located at a distal end of the first flange engaging portion 40 and defines the projection receiving opening that mates with the projection 35 of the flange 26. The rivet hole 27 can extend through the first and second flange engaging portions 40 and 42.

In this embodiment, the weight portion 38 and the first and second flange engaging portions 40 and 42 have a same length L and a same width W. The flange receiving opening is substantially U-shaped and corresponds to the shape of the flange 26. Other shapes, such as V-Shape, rounded U-shape, or others are possible as long as both the flange receiving opening and the flange 26 mate together in a fully engaging manner. Similarly, the projection receiving opening is illustrated as having two angled faces that meet at a flat surface to mate with the inversely shaped projection 35. Alternative shapes are possible for the projection receiving opening and the projection 35 such that they mate together in a fully engaging manner.

Figure 4:
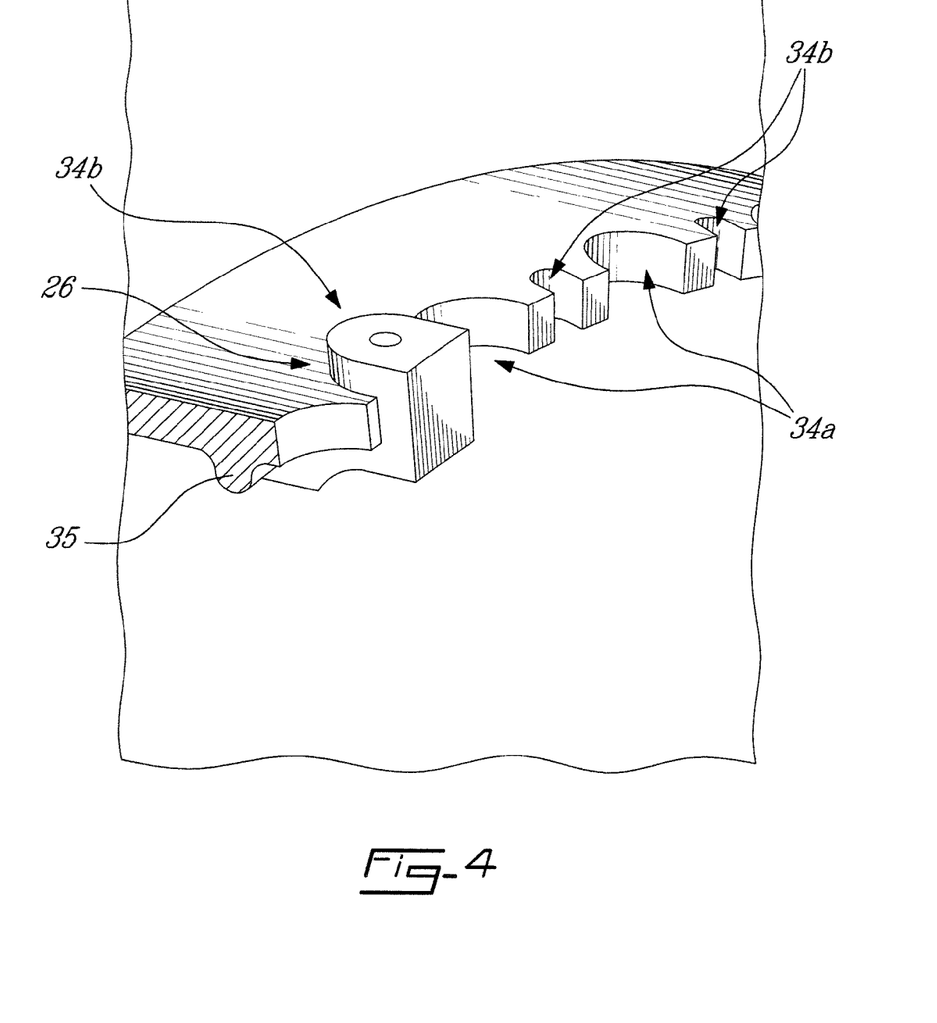
FIG. 4 is a partial perspective view of the recessed flange of FIG. 2 to which the balancing weight of FIGS. 3a and 3b is secured.

FIG. 4 illustrates the flange 26 to which the balancing weight 36 is removably attached. The distance between a positioning recess 34a and an adjacent rivet recess 34b may vary and is selected in accordance with the circumference of the flange 26 and the number of weights that are to be attached thereto. The rivet recess 34b is of smaller dimension than the positioning recess 34a in which the weight has first been radially inserted to permit the engagement of the balancing weight 36 with the projection 35. The balancing weight 36 is slid sideways along the flange 36 to an adjacent rivet recess 34b such that the rivet hole 27 in the balancing weight 36 be aligned with the rivet recess 34b. Thereafter, a rivet (not shown) is engaged in the rivet hole 27 defined in the balancing weight 36 and in the rivet recess 34b of the flange 26 to prevent the balancing weight 36 from being slid back to its original position. The balancing weight is locked against circumferential movement relative to the flange 26 by the engagement of the rivet in the rivet recess 34b of the flange 26.

Figure 5:
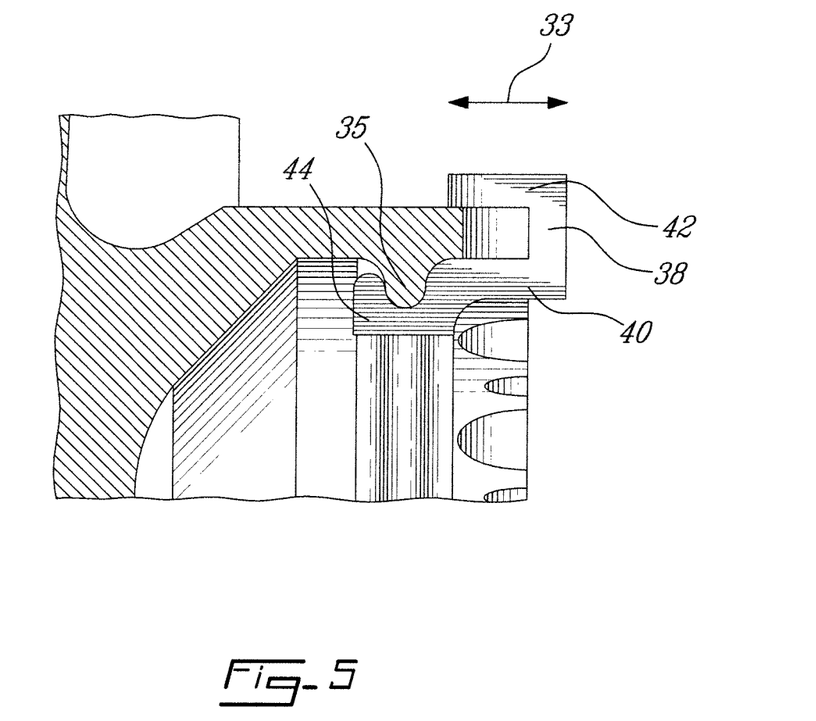
FIG. 5 is a side view of a balancing weight when engaged with the projection of the flange, in accordance with an embodiment.

When the balancing weight 36 is in an engaged position, i.e. when the balancing weight 36 is removably secured to the flange 26, the balancing weight 36 conforms to the shape of the portion of the flange 26 at a rivet recess 34b to which the balancing weight 36 is secured, as illustrated in FIG. 5. As a result, the first flange engaging portion 40, the second flange engaging portion 42, the weight portion 38, and the hook portion 44 respectively engage the circumferential edge 32 of the flange 26 and the projection 35. As the hook portion 44 is engaged with the projection 35, the balancing weight is prevented from axial displacement (direction 33) and the rivet prevents circumferential displacement (direction 39). This prevents any displacement of the balancing weight 36 along the longitudinal rotational axis of the disc 20. As a result, the balancing weight 36 is fixedly maintained in position during a rotation of the disc 20 while being removable from the flange 26. Conventional rivets and riveting tools for assembly may be used, and peening of the disc balancing rim and rivet positioning recess may be performed, if desired. The circumferential position, i.e. the particular rivet recesses 34b at which the balancing weight 36 is to be secured, and the mass of the balancing weight 36 are chosen to balance the disc 20 and/or the rotor assembly comprising the disc 20.

Figure 6:
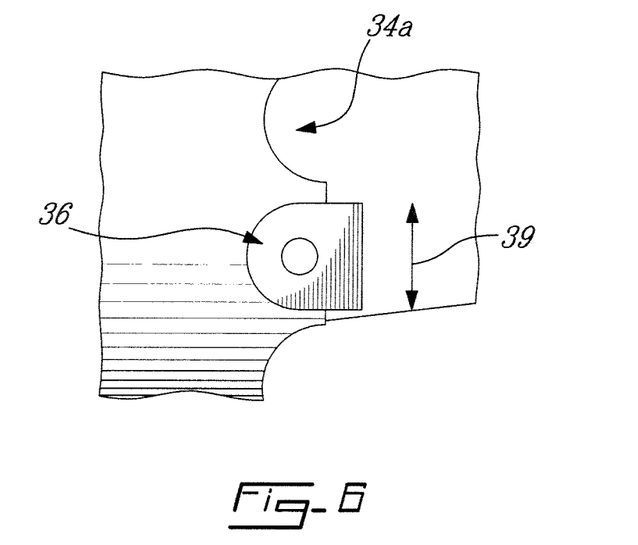
FIG. 6 is a top view of a balancing weight when aligned with a rivet recess, in accordance with an embodiment.

FIG. 6 is a top view of the balancing weight engaged in the rivet recess 34b, with a positioning recess 34a on either side. The balancing weight 36 may be slid in either direction 39 to an adjacent rivet recess 34b.

In one embodiment, the disc 20 is part of a rotor assembly present in the multistage compressor 14 such as shown in FIG. 1. Alternatively, the disc can be part of a rotor assembly present in the turbine section 18 illustrated in FIG. 1. It should be understood that a number of balancing weights 36 can be secured to the flange 26 at predetermined circumferential positions as required to balance the disc 20.

It should be noted that the shape and size of the recesses 34a, 34b may vary. For example, the positioning recesses 34a may be square or rectangular while the rivet recesses 34b may be circular or ellipsoidal. The recesses 34a, 34b, may be scallop shaped. The shape and size of the positioning recess 34a is designed to receive the second flange portion 42 but does not need to be the same shape. For example, the positioning recesses 34b may be square while the second flange portion 42 may be rounded. The positioning recesses 34b should be large enough to allow the second flange portion to slide through upwardly when the hook portion 44 is engaged with the projection 35. The shape and size of the rivet recesses 34b may vary in accordance with the shape and size of the rivet holes and the rivets. Larger or smaller rivet recesses 34b may be provided when corresponding changes are made to the rivets and the rivet holes of the balancing weight 36.

The dimension of the flange receiving space defined by the first flange engaging portion 40, the weight portion 38, and the second flange engaging portion 42 should be large enough to mate with the circumferential edge 32 of the flange 26 and allow the balancing weight 36 to be slid along the flange 26 in the circumferential direction.

The shape and the dimensions of the balancing weight 36 may vary as long as the hook portion 44 engages with the projection 35, at least part of the flange engaging portion 25 is small enough to fit through the positioning recess 34a, the balancing weight 36 can be slid circumferentially along the flange 26, and the rivet recess 34b can receive the rivet which passes through the rivet hole 27 and locks the balancing weight 36 in place circumferentially.

For example, in one embodiment the length of the second flange portion 44 may be greater than or less than the length of the first flange portion 40. The first flange portion 40 is designed to abut the projection 35 to securely engage therewith. The second flange portion 44 should be long enough to provide stability to the balancing weight 36 once secured. In addition, the width of the weight portion 38 may be greater than or less than the width of both the first flange portion 40 and the second flange portion 44. When the balancing weight 36 is securely engaged, the outer parts of the weight portion 38 rest on the circumferential edge 32 while the inner part is aligned with the rivet recess 34b recess. The size of the portion that rests on the circumferential edge 32 on each side of the rivet recess 34b is a design choice. In addition, the weight portion 38 may be hour-glass shaped, reverse triangle shaped, or other alternative shapes that do not affect the engaging and locking in of the weight. The thickness of the weight portion 38 is selected in accordance with the desired weight of the balancing weight 36. The balancing weight 36 may have straight or curved edges, or a combination of both.

The balancing weight 36 may be made of any suitable material or combination of materials which provide the appropriate durability in the running environment while allowing the balancing weight to remain securely attached. Materials similar to other turbine engine components may be employed, for example, such as Nickel alloys, Stainless Steels, etc.

The dimensions of the weight portion 38, the first flange engaging portion 40, and/or the second flange engaging portion 42 can be varied in order to vary the weight of the balancing weight 36. Alternatively, the material of the balancing weight 36 may be varied to vary the weight of the balancing weight 36.

The hook portion 44 may have any adequate shape which allows the balancing weight 36 to be held in position in the axial direction. For example, the hook portion 44 may be square or half-circular.

Figure 7A:
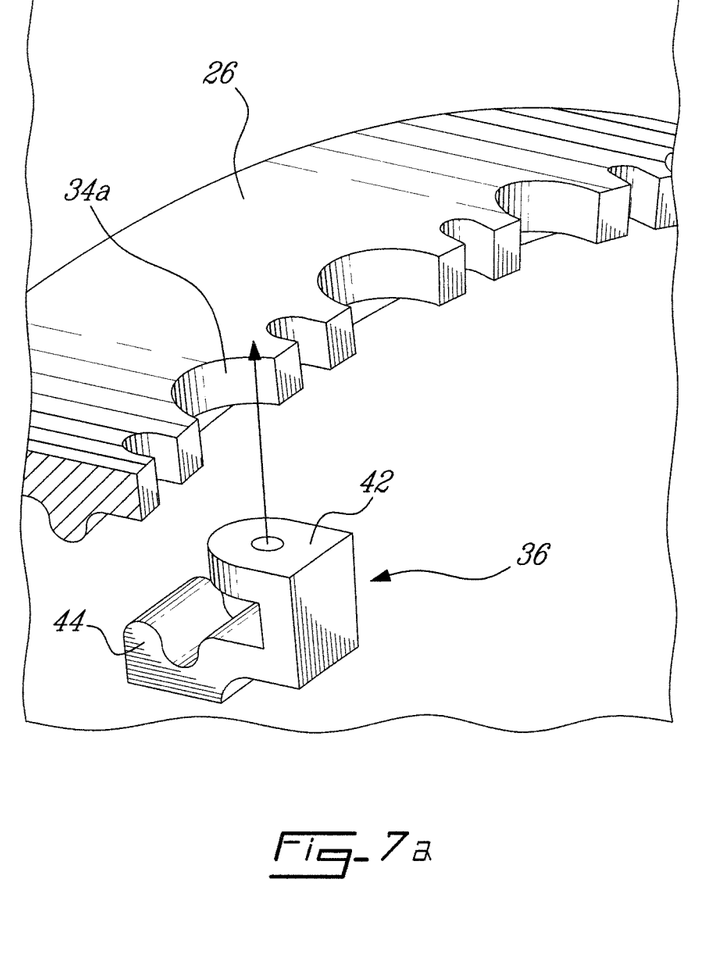
FIGS. 7a-7d is a step-by-step view of the method of attaching the balancing weight to the rotor disc, in accordance with an embodiment.
Figure 7B:
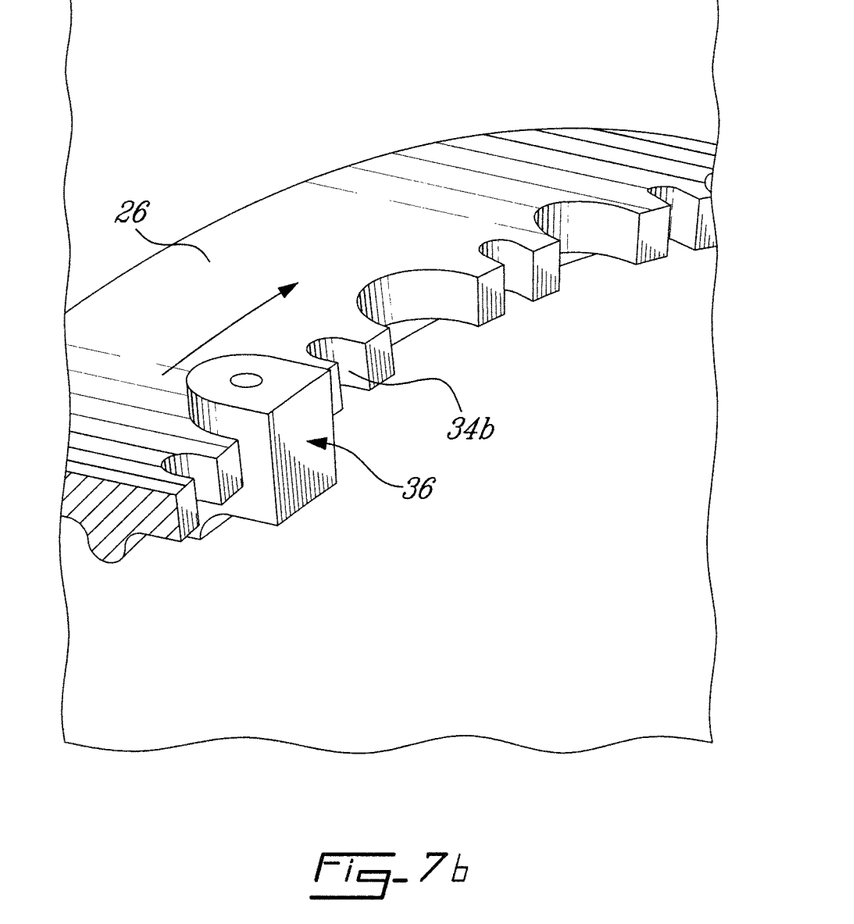
Figure 7C:
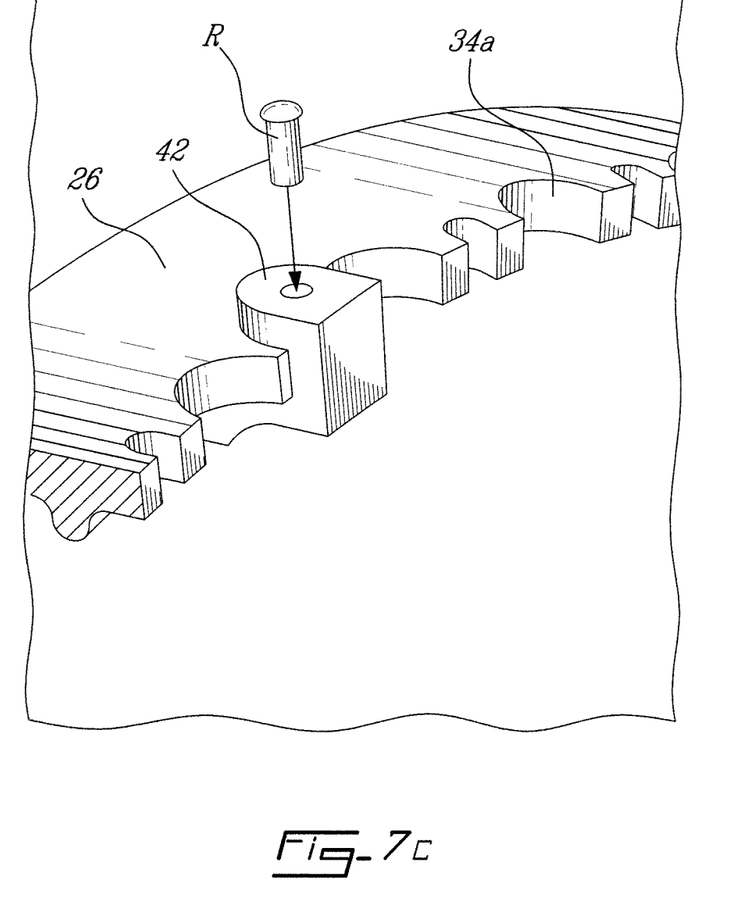
Figure 7D:
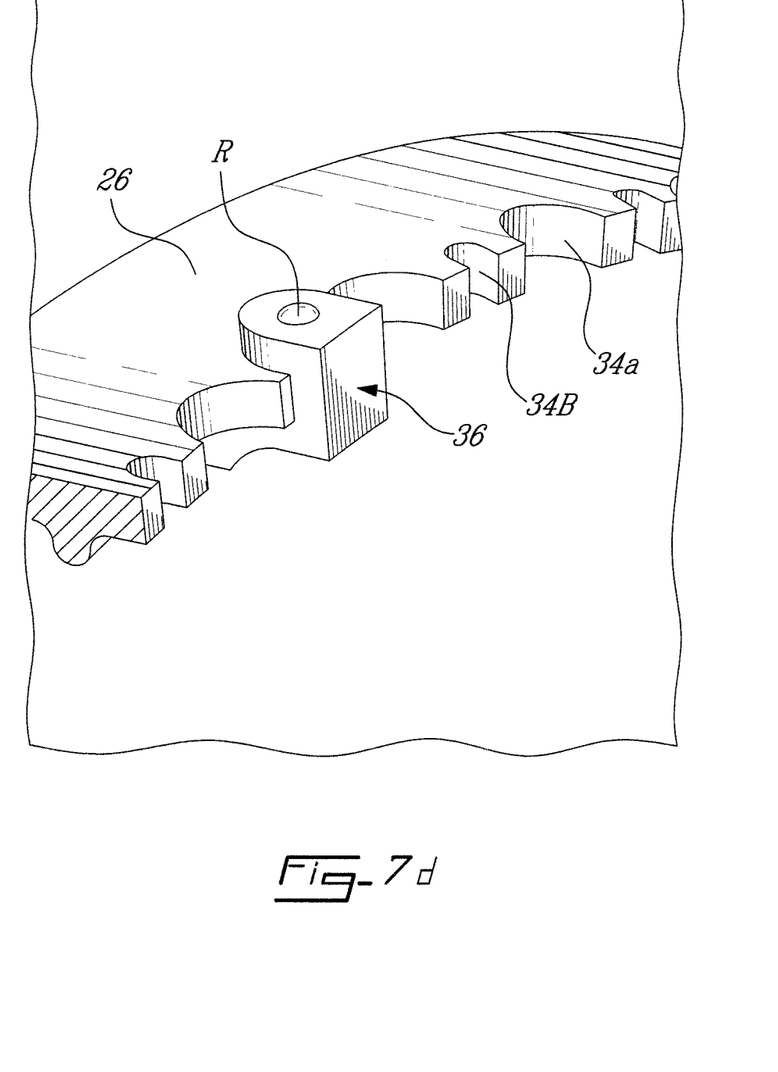

FIGS. 7a to 7d illustrate the different steps in a method for removably securing the balancing weight 36 to the flange 26. FIG. 7a illustrates the position of the balancing weight 36 as it is initially engaged with the disc 20. The balancing weight 36 is inserted through a positioning recess 34a radially from below the flange 26. The projection receiving opening of the hook portion 44 is aligned with the projection 35 of the flange 26 and the second flange portion 42 is aligned with the positioning recess 34a. The balancing weight 36 is raised to engage the hook portion 44 with the projection 35 and the second flange portion 42 is passed through the positioning recess 34a. FIG. 7b illustrates the position of the balancing weight after the balancing weight 36 is axially locked in. The balancing weight 36 is then slid circumferentially along the flange 26 until an adjacent rivet recess 34b is reached. The second flange portion 42 is rested on the radially outward face 28 of the flange 26 when the rivet hole 27 of the balancing weight 36 is aligned with the rivet recess 34b of the flange 26, as per FIG. 7c. A rivet R is then inserted through the aligned rivet hole 27 and rivet recess 34b to circumferentially lock the balancing weight, as illustrated in FIG. 7d.

In one embodiment, a first balancing weight 36 is inserted through a first positioning recess 34a and slid to a non-adjacent rivet recess 34b. In this embodiment, all subsequent balancing weights are inserted through the same positioning recess 34a and slid to different rivet recesses 34b. Sliding may be done in either direction (i.e. clockwise or counter-clockwise). In an alternative embodiment, each positioning recess 34a is followed by an adjacent rivet recess 34b. In this case, a first balancing weight 36 is inserted through a difference positioning recess 34a and slid to an adjacent rivet recess 34b. Again, sliding may be done in either direction (i.e. clockwise or counter-clockwise).

In one embodiment, multiple balancing weights 36 are positioned before any riveting is done. Alternatively, each balancing weight 36 is positioned and riveted before a subsequent balancing weight 36 is positioned.

It should be understood that the balancing weights 36 are inserted through a positioning recess 34a from a direction including the projection 35. If the projection 35 is provided on the radially outer face 28 of the flange 26, then the balancing weight is assembled from the top surface of the flange 26 instead of from the bottom surface.

The above description is meant to be exemplary only, and one skilled in the art will recognize that changes may be made to the embodiments described without departing from the scope of the invention disclosed. For instance, it is understood that lock pins or other type of fasteners could be used in place of rivets to lock the balancing weight against circumferential movement on the flange 26. The teachings herein may be applied to any suitable gas turbine engine type, such as turbofan, turboprop, turboshaft, auxiliary power unit, industrial gas turbine, etc. Still other modifications which fall within the scope of the present invention will be apparent to those skilled in the art, in light of a review of this disclosure, and such modifications are intended to fall within the appended claims.

The invention claimed is:

1. A rotor assembly for a gas turbine engine, comprising:
a disc adapted for mounting to an engine shaft defining a longitudinal axis, the disc having two opposed faces;
a flange extending axially from one of the two opposed faces of the disc along a circumference thereof, an edge of the flange having at least one positioning recess and a plurality of circumferentially spaced-apart fastener recesses, the at least one positioning recess being larger than the fastener recesses;

a projection extending circumferentially along a radially facing surface of the flange;

at least one balancing weight comprising a flange engaging portion and a hook portion, the flange engaging portion defining a flange receiving opening for mating with the flange of the disc, the hook portion extending from one end of the flange engaging portion and defining a projection receiving opening for mating with the projection, at least part of the flange engaging portion being sized to fit through the positioning recess when engaging the hook portion with the projection to lock the balancing weight in an axial direction with respect to the disc, the balancing weight having a fastener hole extending through at least part of the flange engaging portion, the fastener hole being aligned with one of the fastener recesses when the balancing weight is secured to the disc; and a fastener inserted through the fastener hole and the one of the fastener recesses to lock the balancing weight in a circumferential direction with respect to the disc.

2. The rotor assembly as claimed in claim 1, wherein the flange engaging portion comprises a first flange engaging portion, a second flange engaging portion, and a weight portion therebetween defining the flange receiving opening, and the hook portion extends from a distal end of the first flange engaging portion.

3. The rotor assembly as claimed in claim 1, wherein the at least one positioning recess comprises a plurality of positioning recesses, the positioning recesses and the fastener recesses alternating around a circumference of the flange.

4. The rotor assembly as claimed in claim 1, wherein the at least one positioning recess and the fastener recesses are scallop shaped.

5. The rotor assembly as claimed in claim 1, wherein the projection comprises two inclined faces that meet along a flat surface.

6. The rotor assembly as claimed in claim 1, wherein the flange receiving opening is substantially U-shaped.

7. The rotor assembly as claimed in claim 2, wherein the fastener hole extends through the second flange engaging portion, and an end of the fastener is positioned between the first flange engaging portion and the second flange engaging portion.

8. The rotor assembly as claimed in claim 1, wherein the at least one balancing weight is made of a single integral piece.

9. A rotor disc balancing weight system comprising: a disc, the disc having a flange extending axially from a face of the disc around a circumference thereof, an edge of the flange having at least one positioning recess and at least one rivet recess, the at least one positioning recess being larger than the at least one rivet recess, the flange having a projection extending circumferentially along a surface thereof; and at least one balancing weight having:
a flange engaging portion defining a flange receiving opening for mating with the flange, a rivet hole extending through at least part of the flange engaging portion, the rivet hole corresponding in size to the rivet recess and adapted to receive a rivet to lock the balancing weight in a circumferential direction with respect to the disc; and a hook portion extending from one end of the flange engaging portion and defining a projection receiving opening for mating with the projection, at least part of the flange engaging portion being sized to fit through the positioning recess when engaging the hook portion with the projection to lock the balancing weight in an axial direction with respect to the disc.

10. The balancing weight system as claimed in claim 9, wherein the flange engaging portion comprises a first flange engaging portion, a second flange engaging portion, and a weight portion therebetween defining the flange receiving opening, and the hook portion extends from a distal end of the first flange engaging portion.

11. The balancing weight system as claimed in claim 10, wherein a distal end of the second flange portion is rounded.

12. The balancing weight system as claimed in claim 9, wherein the flange receiving opening is U-shaped.

13. The balancing weight system as claimed in claim 9, wherein the projection receiving opening comprises two inclined faces that meet along a substantially flat surface.

14. The balancing weight system as claimed in claim 9, wherein the rivet hole is circular.

15. The balancing weight system as claimed in claim 10, wherein the rivet hole extends through the second flange engaging portion.

16. The balancing weight system as claimed in claim 9, wherein the flange engaging portion and the hook portion are made of a single integral piece.

17. A method for attaching a balancing weight to a rotor disc, the disc having a flange extending axially from a face of the disc around a circumference thereof, an edge of the flange having at least one positioning recess and at least one rivet recess, the at least one positioning recess being larger than the at least one rivet recess, the flange having a projection extending circumferentially along a surface thereof, the method comprising:

radially inserting at least one balancing weight into one of the at least one positioning recess, the at least one balancing weight having a flange engaging portion defining a flange receiving opening for mating with the flange, a rivet hole extending through at least part of the flange engaging portion, and a hook portion extending from one end of the flange engaging portion and defining a projection receiving opening for mating with the projection, at least part of the flange engaging portion being sized to fit through the positioning recess;

engaging the hook portion with the projection to lock the at least one balancing weight in an axial direction with respect to the disc;

sliding the at least one balancing weight along the circumference of the flange such that the rivet hole is aligned with one of the at least one rivet recesses; and inserting a rivet through the aligned rivet hole and rivet recess to lock the at least one balancing weight in a circumferential direction with respect to the disc.

18. The method as claimed in claim 17, wherein the radially inserting comprises inserting each balancing weight through a different positioning recess.

19. The method as claimed in claim 17, wherein the sliding comprises sliding the balancing weight to an adjacent rivet recess.

20. The method as claimed in claim 17, wherein the radially inserting comprises inserting the at least one balancing weight radially from below the flange.

* * * * *